US012809754B2

(12) United States Patent
Seaton et al.

(10) Patent No.: US 12,809,754 B2
(45) Date of Patent: Nov. 24, 2026

(54) IDENTIFYING AN ISSUE WITH A SOFTWARE APPLICATION BASED ON PREDICTED USER ACTION SEQUENCES

(71) Applicant: Functionize, Inc., Walnut Creek, CA (US)

(72) Inventors: Jonathon R. Seaton, Walnut Creek, CA (US); Tamas Cser, San Francisco, CA (US)

(73) Assignee: Functionize, Inc., San Francisco, CA (US)

( * ) Notice: Subject to any disclaimer, the term of this patent is extended or adjusted under 35 U.S.C. 154(b) by 1362 days.

(21) Appl. No.: 17/287,739

(22) PCT Filed: Oct. 23, 2019

(86) PCT No.: PCT/US2019/057720
§ 371 (c)(1),
(2) Date: Apr. 22, 2021

(87) PCT Pub. No.: WO2020/086757
PCT Pub. Date: Apr. 30, 2020

(65) Prior Publication Data

US 2021/0397542 A1 Dec. 23, 2021

Related U.S. Application Data

(60) Provisional application No. 62/749,527, filed on Oct. 23, 2018.

(51) Int. Cl.
*G06F 11/3668* (2025.01)
*G06F 11/34* (2006.01)
(Continued)

(52) U.S. Cl.
CPC ...... *G06F 11/3684* (2013.01); *G06F 11/3438* (2013.01); *G06N 3/047* (2023.01); *G06N 3/08* (2013.01)

(58) Field of Classification Search
None
See application file for complete search history.

(56) References Cited

U.S. PATENT DOCUMENTS 9,244,510 B1 * 1/2016 Conrad .................. G06F 11/30
2005/0204201 A1 9/2005 Meenakshisundaram et al.
(Continued)

OTHER PUBLICATIONS

Cummins, C. et al., "Compiler fuzzing through deep learning," Proc of the 27th ACM SIGSOFT Intl. Symp. on Software Testing and Analysis (Jul. 2018) pp. 95-105. (Year: 2018).*
(Continued)

*Primary Examiner* — Brian M Smith
(74) *Attorney, Agent, or Firm* — Brian F. Russell

(57) ABSTRACT

A system for generating a test case for a software application. The system includes an electronic processor. The electronic processor is configured to receive user actions recorded as a user interacts with a first software application
(Continued)

and generate a probabilistic graphical model using recorded user actions. The electronic processor is also configured to divide the probabilistic graphical model into clusters of similar sequences of user actions, determine a test case from a cluster of similar sequences of user actions using a machine learning system, and execute the test case.

16 Claims, 10 Drawing Sheets

(51) Int. Cl.

| | |
|---|---|
| ***G06N 3/047*** | (2023.01) |
| ***G06N 3/08*** | (2023.01) |

(56) References Cited

U.S. PATENT DOCUMENTS

| | | | |
|---|---|---|---|
| 2010/0332423 | A1 | 12/2010 | Kapoor et al. |
| 2011/0004868 | A1 * | 1/2011 | Bharadwaj .......... G06F 11/3676 717/124 |
| 2011/0016451 | A1 | 1/2011 | Gorthi et al. |
| 2013/0055029 | A1 | 2/2013 | Lawrance et al. |
| 2013/0346948 | A1 | 12/2013 | Zhang et al. |
| 2014/0258987 | A1 | 9/2014 | Zhou et al. |
| 2016/0283225 | A1 | 9/2016 | Akbulut et al. |
| 2017/0364680 | A1 * | 12/2017 | Haerterich ............ G06F 21/552 |
| 2019/0004926 | A1 * | 1/2019 | Bangalore Krishnamurthy .......... G06F 11/3672 |

OTHER PUBLICATIONS

Whittaker, J. et al., "A markov chain model for statistical software testing," IEEE Trans. on Software Engineering (Oct. 1994) pp. 812-824. (Year: 1994).*

Zhou, K. et al., "Software reliability test based on markov usage model," Journal of Software, vol. 7, No. 9 (Sep. 2012) pp. 2061-2068. (Year: 2012).*

Whittaker, J.A. et al., "A markov chain model for predicting the reliability of multi-build software," Information and Software Technology, vol. 42 (2000) pp. 889-894. (Year: 2000).*

International Search Report for PCT/US2019/057720, mailed Jan. 16, 2020, 6 pages.

European Search Report for EP App. No. 19876216.3, mailed Jun. 22, 2022, 10 pages.

Brooks et al. Automated gui testing guided by usage profiles. Automated Software Engineering, ACM, Nov. 5, 2007, pp. 333-342.

Hunt C.J. et al. Automatic testing of Natural user interfaces. IEEE Seventh International Conference on Software Testing, Verification and Validation, Mar. 13, 2014, pp. 123-133.

First Examination Report for IN App. 202117018857, mailed Nov. 16, 2022, 6 pages.

* cited by examiner

IDENTIFYING AN ISSUE WITH A SOFTWARE APPLICATION BASED ON PREDICTED USER ACTION SEQUENCES

RELATED APPLICATIONS

This application claims priority to U.S. Provisional Patent Application No. 62/749,527, filed Oct. 23, 2018, the entire content of which is hereby incorporated by reference.

SUMMARY

When a new software application or a new version of a software application is deployed it is important to generate test cases to determine that the software application is functioning properly. A test case includes, for example, one or more computer executable instructions that when executed by an electronic processor interact with the software application in a manner that a user would.

Described herein are a system and method for the automatic generation of test cases based on user interactions with the software application. Some embodiments herein describe utilizing recorded user interactions with a software application received from user devices to determine test cases. Some embodiments described herein do not require human feedback to generate test cases and allow test cases to be generated independent test scripting languages. In some embodiments, the user devices from which recorded interactions are received are part of a test group. In some cases, the software application is provided to or accessed by user devices included in the test group before it is provided to a larger group of user devices. Utilizing recorded user interactions with a software application from a plurality of user devices allows for the development of a more robust set of test cases to be created than if test cases were created by a single test writer or a team of test writers.

Additionally, some embodiments described herein also allow for the detection of issues in a software application during test case generation. An issue in a software application may be, for example, a bug in the software application that prevents a user from interacting with the software application in an intended manner. When an issue is identified in a software application during test case generation, release of the software application to user devices other than user devices included in the test group may be delayed and the software application may be modified. Detecting an issue with the software application during generation of test cases for the software application allows for issues to be handled quickly and saves computer resources because test cases need not be run for an issue to be identified.

One example embodiment provides a system for generating a test case for a software application. The system includes an electronic processor. The electronic processor is configured to receive user actions recorded as a user interacts with a first software application and generate a probabilistic graphical model using recorded user actions. The electronic processor is also configured to divide the probabilistic graphical model into clusters of similar sequences of user actions, determine a test case from a cluster of similar sequences of user actions using a machine learning system, and execute the test case.

Another example embodiment provides a method for generating a test case for a software application. The method includes receiving, with an electronic processor, user actions recorded as a user interacts with a first software application and generating, with the electronic processor, a probabilistic graphical model using recorded user actions. The method also includes dividing, with the electronic processor, the probabilistic graphical model into clusters of similar sequences of user actions, determining, with the electronic processor, a test case from a cluster of similar sequences of user actions using a machine learning system, and executing the test case.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
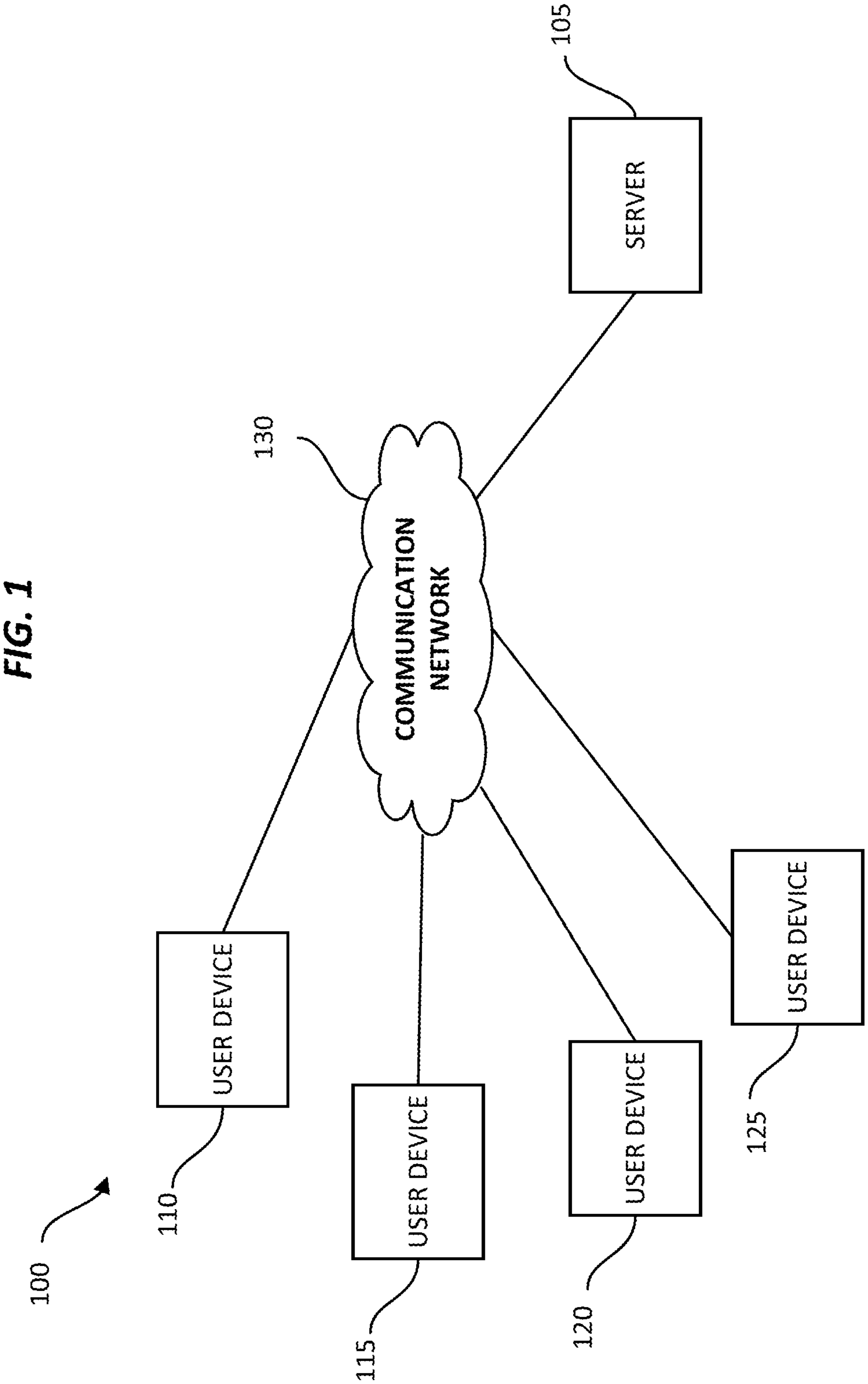
FIG. 1 is a block diagram of an example system for generating test cases for a software application and identifying issues with the software application as a part of test case generation according to some embodiments.

FIG. 1 illustrates an example system 100 for generating test cases for a software application and identifying issues with the software application as a part of test case generation. The system 100 illustrated in FIG. 1 includes a server 105 and one or more user devices 110, 115, 120, 125. The server 105 and the user devices 110, 115, 120, 125 communicate over one or more wired or wireless communication networks 130. Portions of the wireless communication networks 130 may be implemented using a wide area network, for example, the Internet, a local area network, for example, a Bluetooth™ network or Wi-Fi, and combinations or derivatives thereof. It should be understood that the server 105 may communicate with a different number of user devices, and the four user devices 110, 115, 120, 125 illustrated in FIG. 1 are purely for illustrative purposes. Similarly, it should also be understood that the system 100 may include a number of servers and the single server 105 illustrated in FIG. 1 is purely for illustrative purposes. Also, in some embodiments, one of the user devices 110, 115, 120, 125 may communicate with the server 105 through one or more intermediary devices (not shown).

Figure 2:
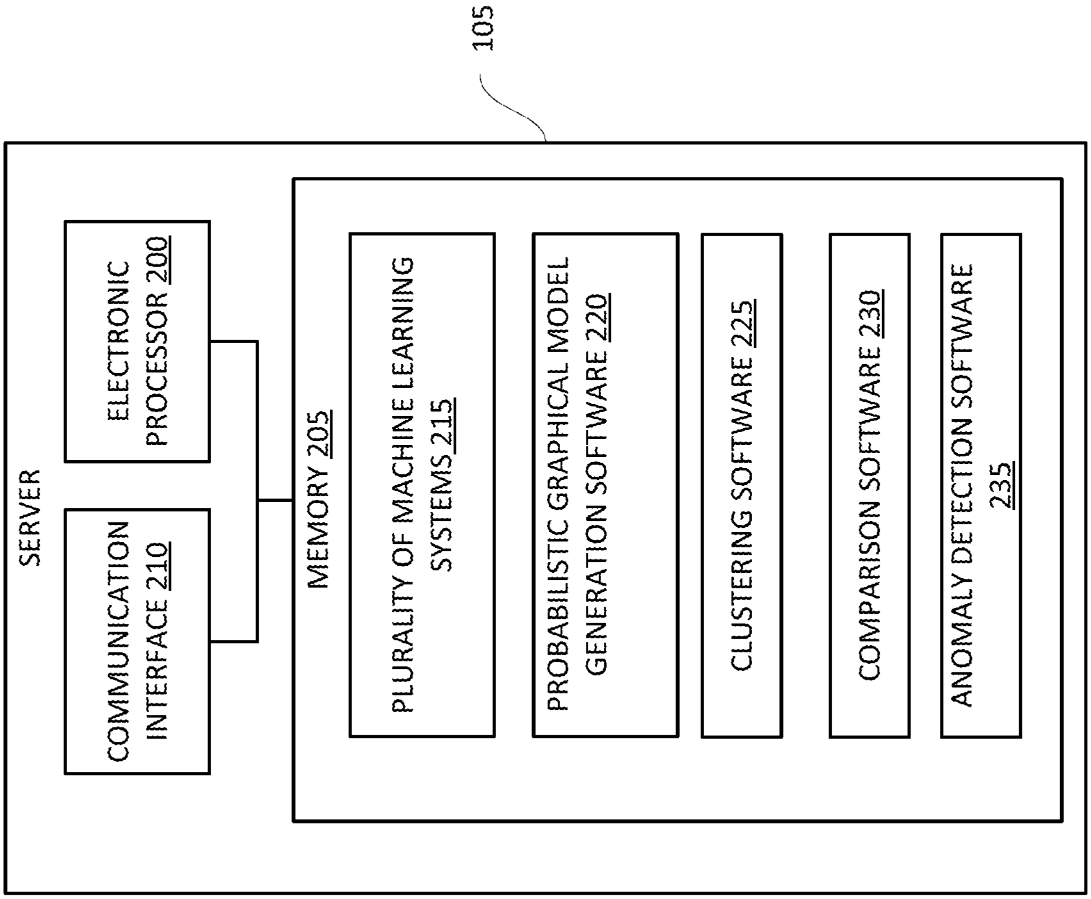
FIG. 2 is a block diagram of an example server included in the system of FIG. 1.

FIG. 2 schematically illustrates the server 105 according to some embodiments. As illustrated in FIG. 2, the server 105 is an electronic computing device that includes an electronic processor 200 (for example, a microprocessor, application-specific integrated circuit (ASIC), or another suitable electronic device), a memory 205 (a non-transitory, computer-readable storage medium), and a communication interface 210, for example, a transceiver, for communicating over the communication network(s) 130 and, optionally, one or more additional communication networks or connections. The electronic processor 200, the memory 205, and the communication interface 210 communicate wirelessly, over one or more communication lines or buses, or a combination thereof. It should be understood that the server 105 may include additional components than those illustrated in FIG. 2 in various configurations and may perform additional functionality than the functionality described herein. Furthermore, the functionality described herein as being performed by the server 105 may be performed in a distributed nature via a plurality of servers or similar devices included in a cloud computing environment.

As illustrated in FIG. 2, the memory 205 included in the server 105 includes a plurality of machine learning systems 215, probabilistic graphical model generation software 220, clustering software 225, comparison software 230, and anomaly detection software 235. When executed by the electronic processor 200, the plurality of machine learning systems 215, probabilistic graphical model generation software 220, clustering software 225, comparison software 230, and anomaly detection software 235 perform a set of functions, including the methods described herein. Each of the plurality of machine learning systems 215 may be neural networks (for example, convolutional neural networks, recurrent neural networks, or the like), Bayesian networks, random forests, or the like. It should be understood that the functionality described herein as being performed by each of the plurality of machine learning systems 215, probabilistic graphical model generation software 220, clustering software 225, comparison software 230, and anomaly detection software 235 may be distributed among multiple applications or software components.

In some embodiments, the server 105 is configured (through execution of one or more software applications by the electronic processor 200) to provide at least some of the functionality described herein as being performed by the user device 110.

Figure 3:
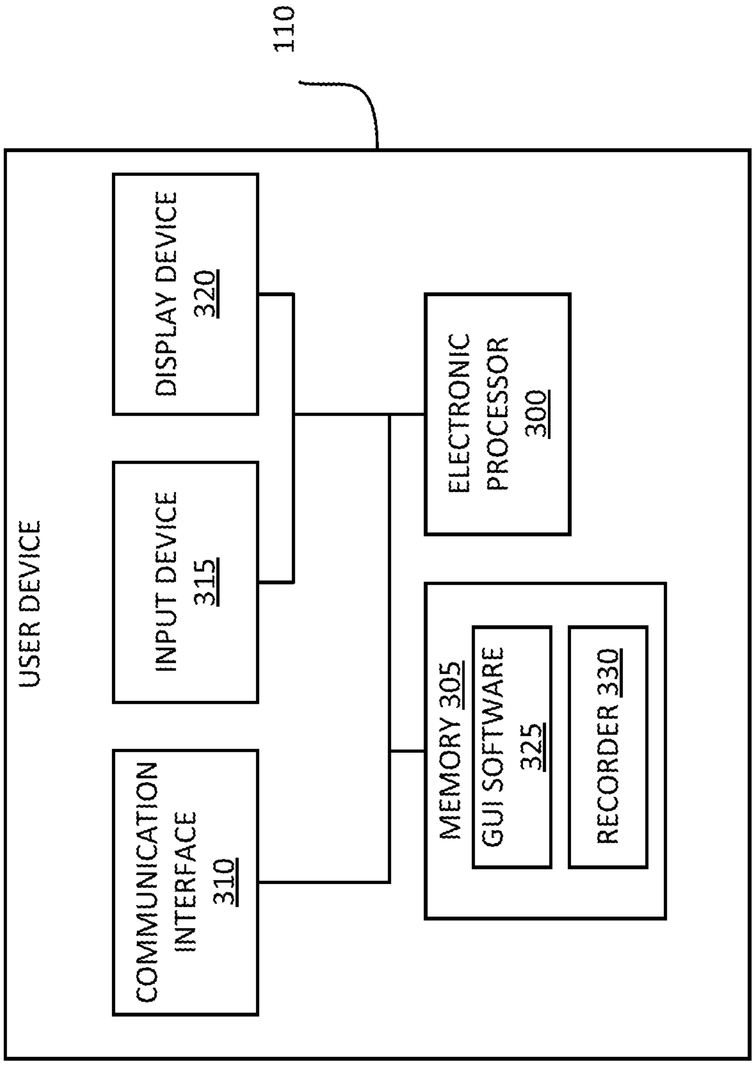
FIG. 3 is a block diagram of an example user device included in the system of FIG. 1.

FIG. 3 schematically illustrates the user device 110 according to some embodiments. The user device 110 may be a laptop or desktop computer, a tablet computer, smart phone, or other computing device. As illustrated in FIG. 3, the user device 110 is electronic computing device that includes an electronic processor 300 (for example, a microprocessor, application-specific integrated circuit (ASIC), or another suitable electronic device), a memory 305 (a non-transitory, computer-readable storage medium), and a communication interface 310, for example, a transceiver, for communicating over the communication network(s) 130 and, optionally, one or more additional communication networks or connections. The communication interface 310 allows the user device 110 to communicate with the server 105 over the communication network(s) 130.

The user device 110 also includes an input device 315 and a display device 320. The display device 320 may include, for example, a touchscreen, a liquid crystal display ("LCD"), a light-emitting diode ("LED"), a LED display, an organic LED ("OLED") display, an electroluminescent display ("ELD"), and the like. The input device 315 may include, for example, a keypad, a mouse, a touchscreen (for example, as part of the display device 320), a microphone, a camera, or the like (not shown). The electronic processor 300, the memory 305, the communication interface 310, the input device 315, and the display device 320 communicate over one or more communication lines or buses, wirelessly, or a combination thereof. It should be understood that the user device 110 may include additional components than those illustrated in FIG. 3 in various configurations and may perform additional functionality than the functionality described herein. For example, in some embodiments, the user device 110 includes multiple electronic processors, multiple memories, multiple communication interfaces, multiple input devices, multiple output devices, or a combination thereof. Also, it should be understood that, although not described or illustrated herein, the user devices 115, 120, 125 may include similar components and perform similar functionality as the user device 110.

As illustrated in FIG. 3, the memory 305 included in the user device 110 includes GUI software 325 and a recorder 330. When executed by the electronic processor 300 in coordination with a software application (for example, an operating system), the GUI software 325 presents a GUI on the display device 320. The GUI includes one or more GUI elements. GUI elements may include a window, a tab, a checkbox, a radio button, a drop down list, a list box, a dropdown button, a toggle, a text field, a visual button, a search field, a slider, a combination of the foregoing, and the like. It should be understood that the functionality described herein as being performed by the GUI software 325 and recorder 330 may be distributed among multiple applications or software components.

In some embodiments, the user device 110 is configured (through, for example, execution of one or more software applications by the electronic processor 300) to provide at least some of the functionality described herein as being performed by the server 105.

Figure 4:
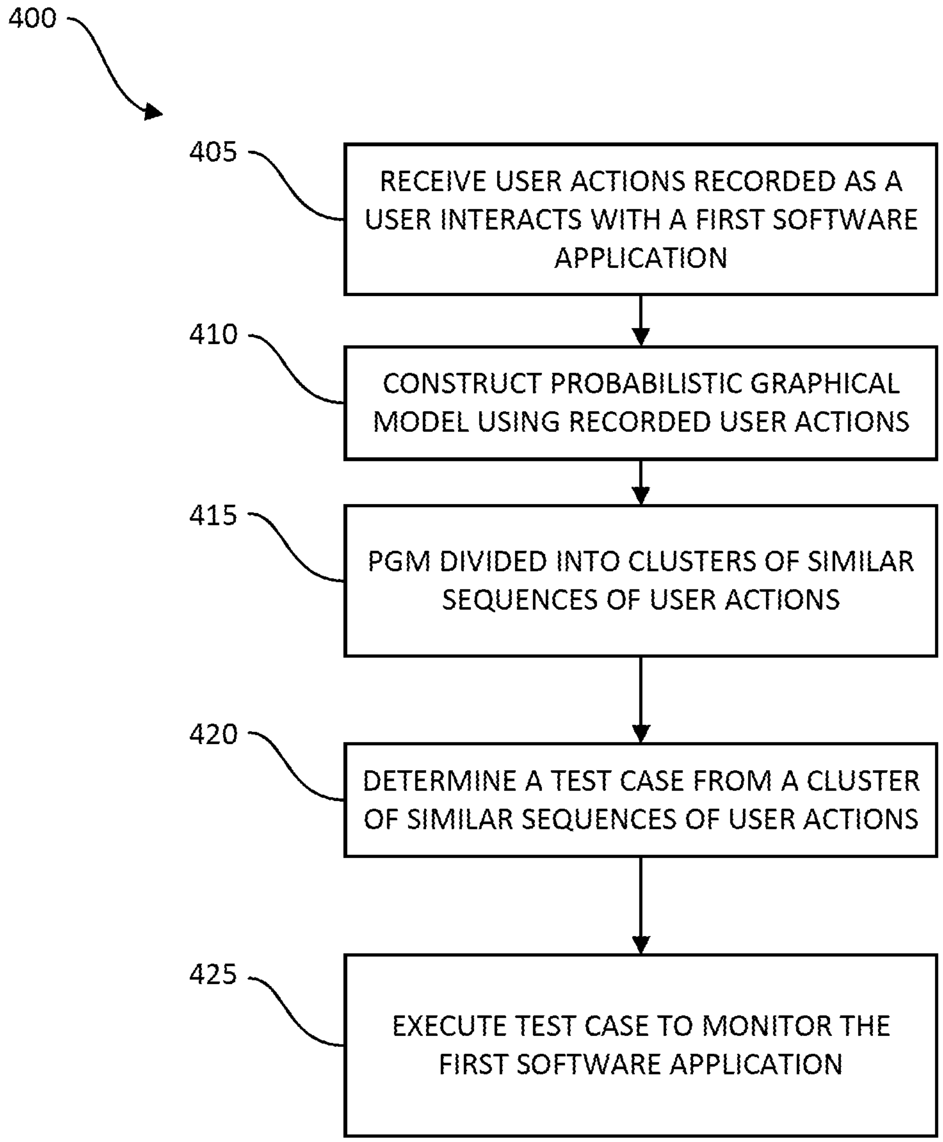
FIG. 4 is an example flowchart of a method for using the system of FIG. 1 to generate a test case for a software application according to some embodiments.

FIG. 4 includes an example method 400 for generating a test case for a software application. The method 400 begins at step 405 when an electronic processor executes a recorder (for example, the electronic processor 300 executes the recorder 330) and records user actions as a user interacts with a first software application. The first software application (and the second software application described below) may be stored at a user device, server or both and the functionality described herein as being performed by the first software application and the second software application may be distributed among multiple applications or software components. For example, the first software application may be a web-based e-mail service and the recorded user actions may include, selecting a username text field, selecting a password text field, selecting a GUI button including the text "Login," and selecting a GUI button including the text "Inbox." In some embodiments, a user action is defined by a representation of a GUI element and the action that was performed on the GUI element. The representation of a GUI element may be a vector that describes the GUI element. A vector describing the GUI element may include a natural language phrase associated with the GUI element (for example, text included in a GUI element or adjacent to the GUI element), computer code associated with the GUI element (for example, mark-up language code such as HTML and XML), a screen shot or other graphical representation of the GUI element, a context of the GUI element (position of the GUI element relative to other simultaneously displayed GUI elements), and the like. In addition to receiving the recorded user actions, the electronic processor 200 also receives an indication of the order that the user actions were performed in. In some embodiments, if a second user action is performed more than a predetermined amount of time after a first user action is performed, the electronic processor 200 may receive an indication that the first user action and the second user action are not related. The electronic processor 200 may receive recorded user interactions from one or more user devices included in the system 100. In some embodiments, the system 100 includes a test group of user devices which the first software application is released to before the first software application is released to each user device included in the system 100. In these embodiments, recorded user interactions are be received from user devices included in the test group.

Using the recorded user actions received from one or more user devices, at step 410, the electronic processor 200, when executing the probabilistic graphical model generation software 220 generates a probabilistic graphical model (PGM). The PGM includes a plurality of nodes. Each node represents a GUI element displayed as the user interacts with the first software application. Each node in the PGM may be connected to one or more other nodes in the PGM. A connection between nodes represents that a user sequentially interacts with the GUI elements that the nodes represent. In some embodiments, the direction of the connection between two nodes indicates the order of interaction between the two GUI elements the nodes represent. In some embodiments, each connection is associated with an indication of an action (for example, a left click, a right click, a drag and drop, a hover, double click, keyboard input, or the like) that is performed by a user on the GUI element represented by the node that the connection leads to, a probability that the user performs the action associated with the GUI element represented by the node the connection leads to after interacting with the GUI element that the connection leads from, or both.

Figure 5:
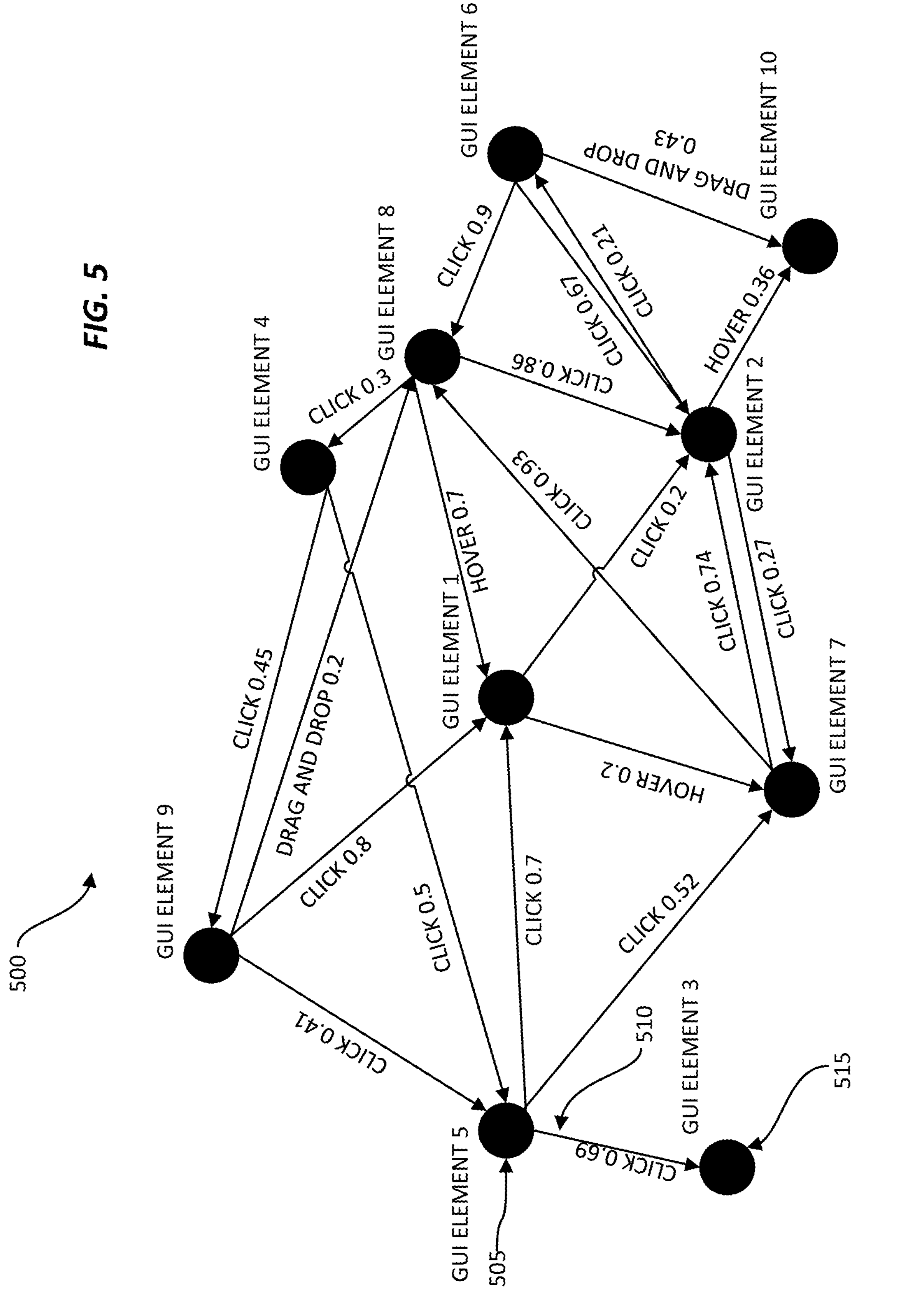
FIG. 5 is an example probabilistic graphical model generated when the method of FIG. 4 is performed.

FIG. 5 illustrates an example PGM 500. In the PGM 500, each connection is associated with a probability that the GUI elements represented by the nodes the connection connects are interacted with one after the other and an action that is performed on the node that the connection leads to. For example, in the PGM 500 a first node 505 representing a GUI element 5 is connected by a connector 510 to a second node 515 representing a GUI element 3. The connector 510 indicates that the GUI element 5 is interacted with before the GUI element 3 is interacted with. The connector 510 is associated with a probability of 69 percent, indicating that there is a 69 percent chance the GUI element 3 is interacted with after the GUI element 5 is interacted with. The connector 510 is also associated with the action click, indicating that the user interacts with the GUI element 3 by clicking on it.

Figure 6A:
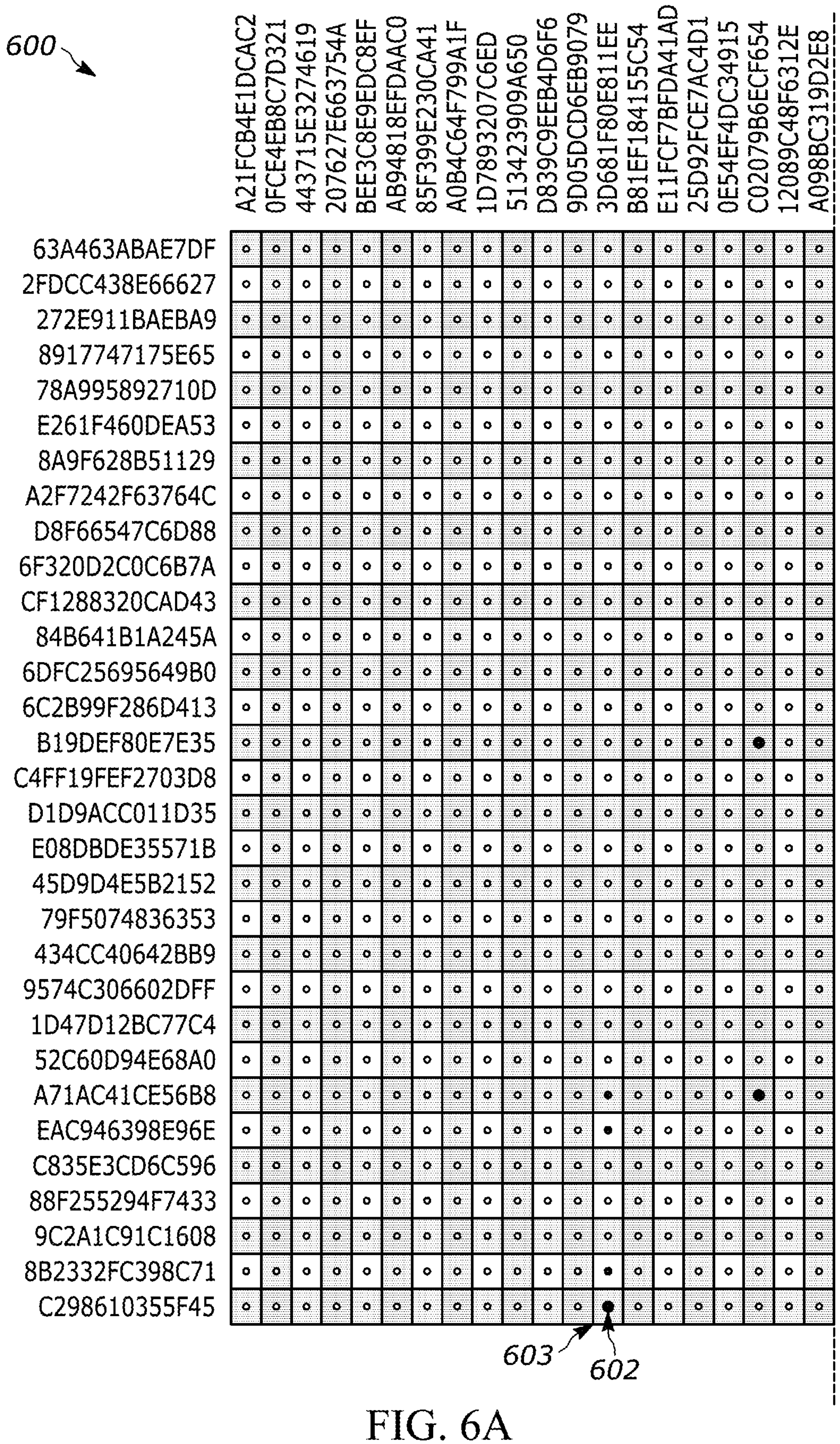
FIG. 6 is an example probabilistic graphical matrix generated when the method of FIG. 4 is performed.
Figure 6B:
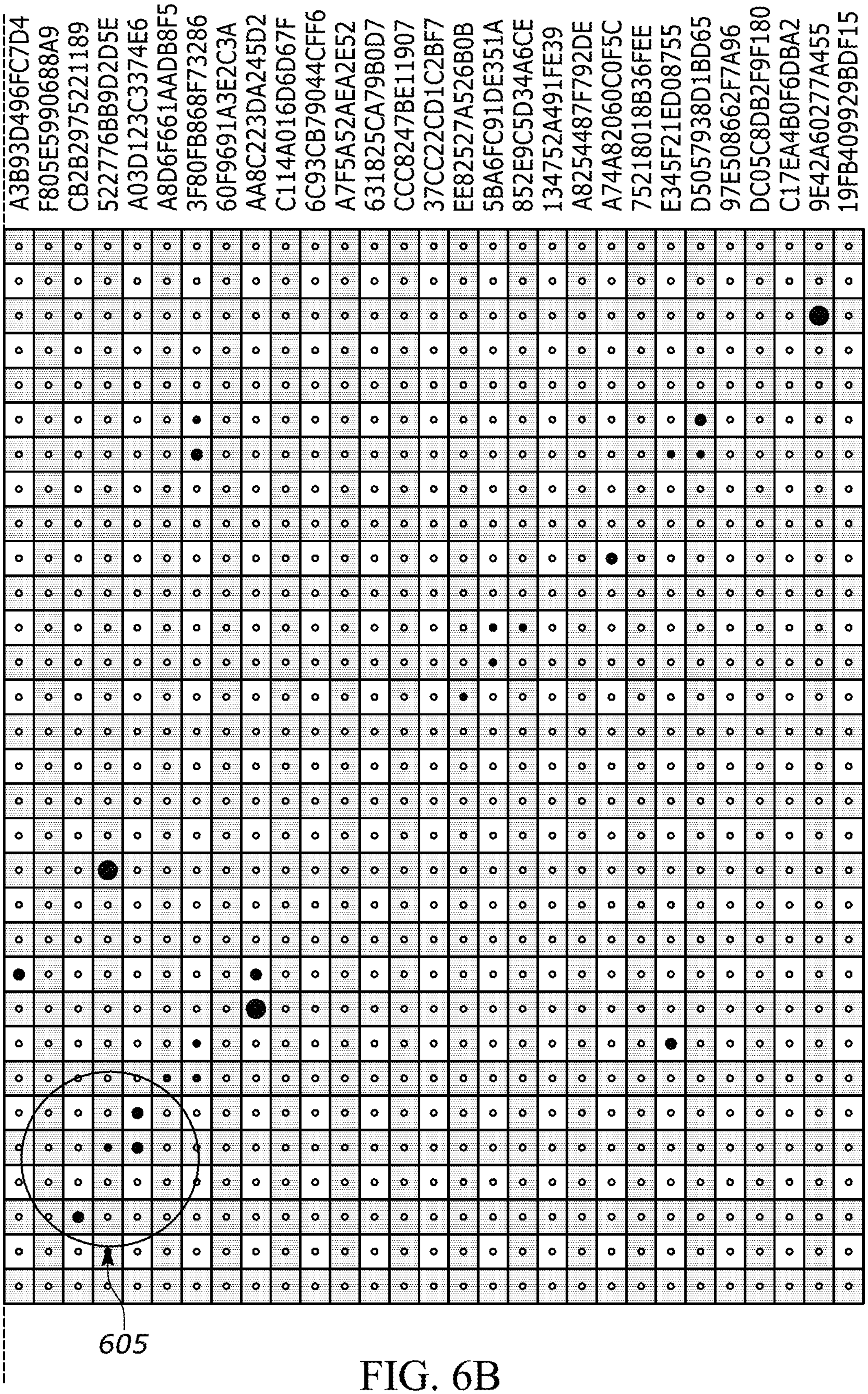

At step 415, the electronic processor 200, when executing the clustering software 225, divides the PGM into clusters of similar sequences of user actions. For example, one cluster may include sequences of user actions associated with composing an email and another cluster may include sequences of user actions associated with filing an email. Clustering of sequences of user actions are based on the similarity of the GUI elements involved in the sequences of user actions. The clustering algorithm utilized by the electronic processor 300 may be, for example, an expectation maximization algorithm. In some embodiments, the electronic processor 200 utilizes an akaike information criterion to determine the appropriate number of clusters to create based on the PGM. FIG. 6 illustrates an example of a matrix 600 representing a PGM. Each row and each column of the matrix 600 is associated with a GUI element displayed when a user interacts with the first software application. Each element in the matrix includes a probability that the GUI elements associated with the row and column of the element are interacted with sequentially. In FIG. 6, the probability is illustrated graphically by the circle included in the element (for example, the circle 602 included in the element 603). The larger the size of the circle, the higher the probability that elements are interacted with sequentially. The circle 605 is indicative of a cluster of sequences of user actions. In some embodiments, rather than dividing the PGM into clusters using one of a plurality of clustering techniques, the PGM is divided into partitions using one of a plurality of graph partitioning techniques.

In some embodiments, the electronic processor 200, when executing the anomaly detection software 235, is configured to remove noise from a cluster generated at step 415 by identifying outlying sequences of user actions in the cluster. For example, to determine a sequence of user actions included in a cluster that is an outlier, the electronic processor 200 may transform (for example, using a power transformation or box-cox transformation) the standard deviation of the cluster to a normal distribution and create a confidence interval for the cluster. One or more sequences of user actions included in the cluster are analyzed to determine how far from the mean of the cluster the sequence is. When a sequence of user actions is farther from the mean of the cluster than the confidence interval, the sequence of user actions is determined to be an outlier. In another example, the electronic processor 200 may determine a sequence of user actions is an outlier using the probability that the user performs the user action that begins sequence of user actions. For example, if there is a low probability that a user performs a user action (relative to the probability that the user performs one or more other possible user actions), the user action and any other user actions performed after it may be considered an outlier. It should be noted that while described above as determining whether a sequence of user actions is an outlier, the electronic processor 200 may determine that a single user action is an outlier. Single user actions or sequences of user actions that are determined to be outliers are considered to be noisy and may be removed from the cluster before step 420 is performed.

At step 420, the electronic processor 200 determines a test case from a cluster of sequences of user actions. As noted above, a test case is a set of computer executable instructions that, when executed by an electronic processor, cause the electronic processor to interact with a software application in a manner similar to a user. A test case can therefore be thought of as a sequence of user actions. In some embodiments, for each cluster generated at step 415, the electronic processor 200 trains a machine learning system using the cluster. A machine learning system is considered to be well trained or be associated with a high confidence value when, given a partial sequence of user actions included in the cluster, the machine learning system outputs the same next action as the next action included in the partial sequence of actions. Consider the example of a sequence of user actions including right clicking a shopping cart icon followed by an 80 percent chance of clicking a proceed to check out button, followed a 40 percent chance of right clicking a credit card icon. If the machine learning system is given the sequence of user actions including right clicking on a shopping cart icon followed by right clicking on a proceed to check out button, the machine learning system is well trained if the machine learning system outputs a 40 percent likelihood that the next step in the sequence is right clicking a credit card icon. The machine learning system is used to generate a test case given a user action. In some embodiments, the electronic processor 200 may determine one or more test cases for each cluster determined at step 415.

Figure 7:
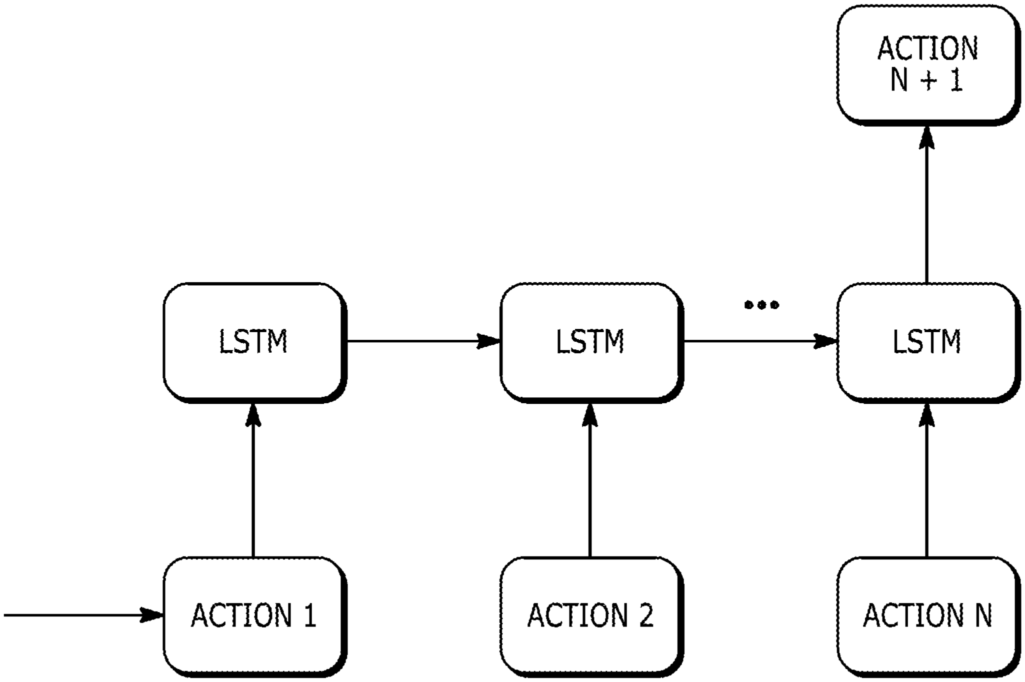
FIG. 7 is an example machine learning system utilized when the method of FIG. 4 is performed according to some embodiments.

In the example illustrated in FIG. 7, the machine learning system is a recurrent neural network (RNN) that includes one or more long short term memory (LSTM) units. Utilizing LSTM units allows the machine learning system to determine a next user action in a sequence of user actions (a test case) based on one or more pervious user actions included in the sequence, as shown in FIG. 7.

Once the test case is generated, the electronic processor 200 may execute the test case to determine whether the first software application is functioning properly. It should be noted that a large number of test cases may be generated. In some embodiments, the execution of test cases may be prioritized based on the likelihood that a user will perform the user actions included in test case. For example, a test case for logging into an application will be given priority over a test case associated with changing privacy settings associated with the application because users login more often than they modify privacy settings. In some embodiments, the electronic processor 200 is configured to generate a natural language description of a test case, a natural language description of the user behavior represented in a trained machine learning system (for example, the machine learning system of FIG. 7), or both.

Figure 8:
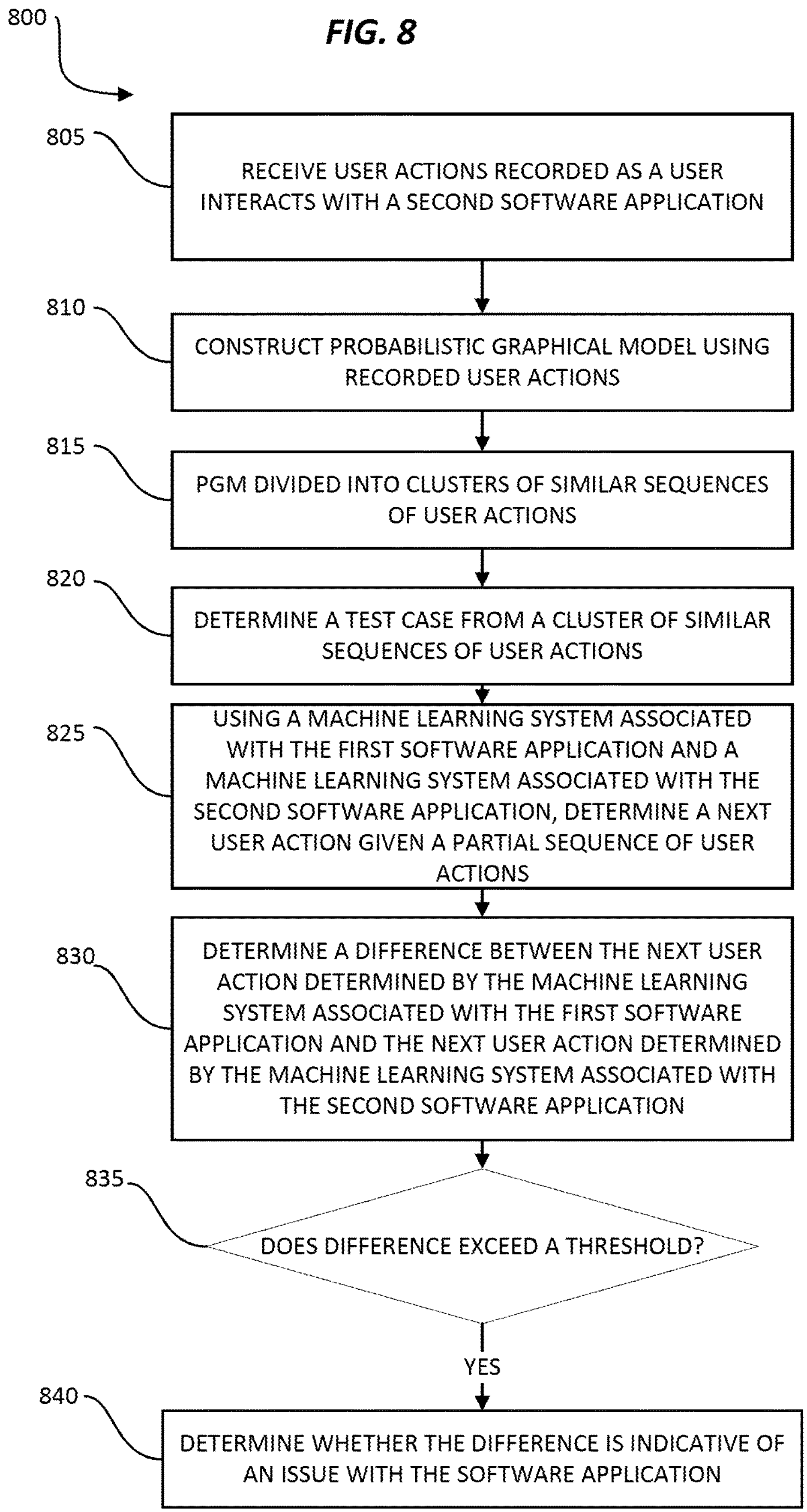
FIG. 8 is an example flowchart of a method for using the system of FIG. 1 to identify issues with a software application as a part of test case generation according to some embodiments.

FIG. 8 illustrates an example method 800 for identifying issues with a software application as a part of test case generation. In the method 800, issues are identified by the outputs machine learning systems generated for different software applications (for example, the first software application and a second software application). In some embodiments, the first software application is an earlier version of the second software application.

The method 800 begins at step 805, when the electronic processor 200 receives user actions recorded as a user interacts with the second software application. Similar to steps 410-420 of the method 400, in steps 810-820 the electronic processor 300 generates a second probabilistic graphical model (PGM) using the user actions received at step 805, divides the second PGM into clusters of similar sequences of user actions, and using a machine learning system trained based on a cluster generated from the second PGM generates a test case.

At step 825, when executing the comparison software 230, the electronic processor 200, using a machine learning system associated with the first software application and a machine learning system associated with the second software application, determines a next user action in a partial sequence of user actions. Both machine learning systems utilized in step 825 may be associated with similar clusters. For example, both machine learning systems may be trained using clusters including sequences of user actions associated with logging in. Both machine learning systems may be provided with the same partial sequence of user actions and determine a next user action in the partial sequence of user actions. Both machine learning systems may also output a value representing their confidence in the next user action they determined.

At step 830, the electronic processor 200 determines a difference between the next user action generated by the machine learning system associated with the first software application to the next user action generated by the machine learning system associated with the second software application. In some embodiments, the electronic processor 200 also determines the difference between the values representing the confidence of each machine learning system in their determination of the next step.

At step 835, the electronic processor 200 determines if the difference between the determined next user actions (and, in some embodiments, the difference between the machine learning systems' confidence in their determinations of the next user action) exceeds a predetermined threshold. The predetermined threshold may be determined based on how well the machine learning systems have been trained.

At step 840, if the electronic processor 200 determines that the determined difference exceeds the predetermined threshold, the electronic processor 200 uses a machine learning system to determine whether the difference is indicative of an issue with the second software application. The electronic processor 200 may be configured to determine whether a difference is indicative of an issue using a machine learning system (for example, a neural network). The machine learning system used to determine whether the difference is indicative of an issue may be trained using issues uncovered in other software applications.

It should be noted that steps 825-840 may be repeated for a plurality of different partial sequence of user actions, a plurality of pairs of machine learning systems (one machine learning system associated with the first software application and one machine learning system associated with the second software application), each trained using a different cluster of sequences of user actions. The number of partial sequence of user actions that steps 825-840 are repeated for may be determined based on how well the machine learning systems utilized in step 825 are trained.

Figure 9:
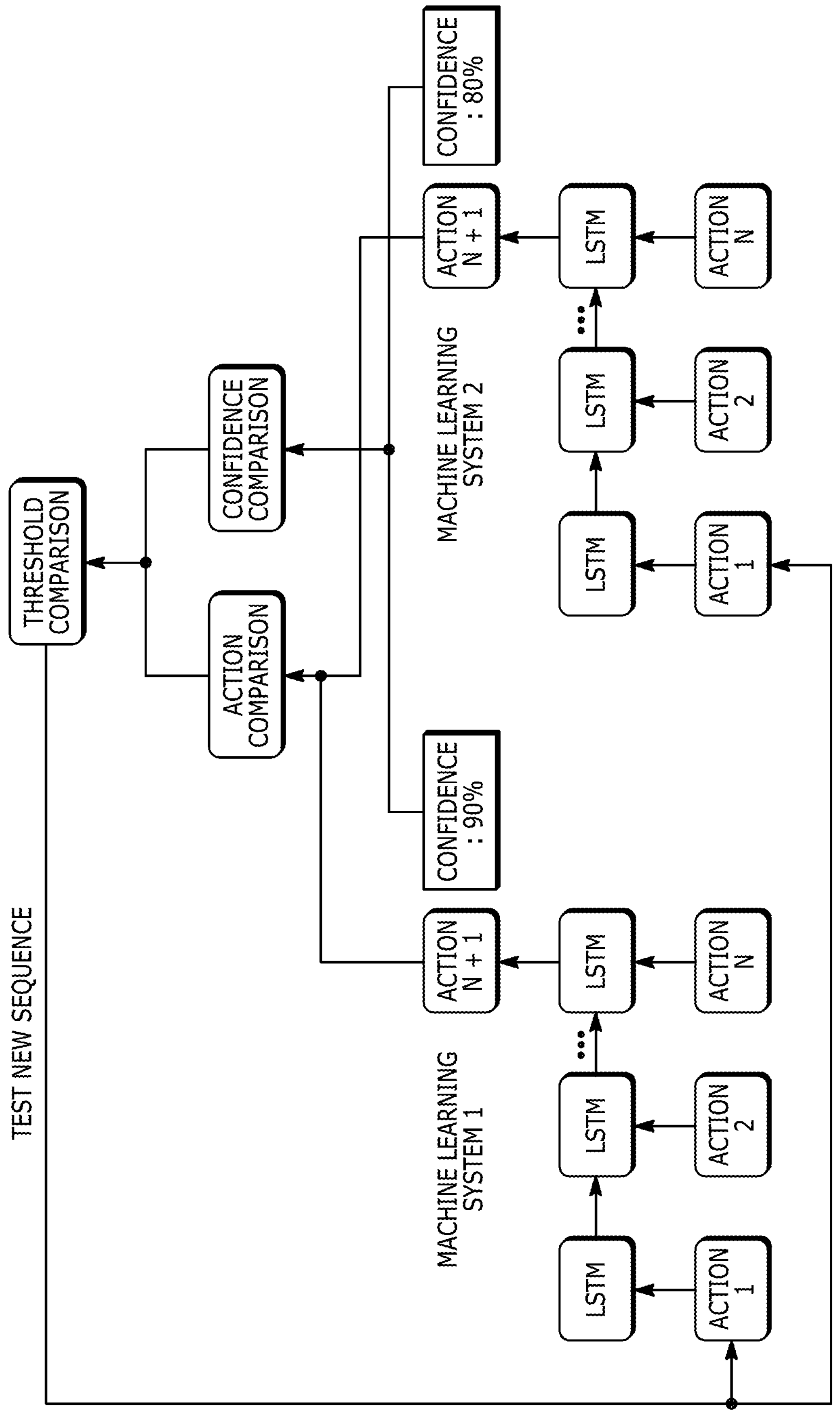
FIG. 9 is an example graphical illustration of part of the method of FIG. 8.

FIG. 9 provides a graphical illustration of steps 825-835 of the method 800.

When no issues are identified with a software application, the software application may be released to each user device included in the system 100 (having previously been available only to user devices included in a test group). When an issue with a software application is identified, the software application may made inaccessible to all user devices included in the system 100, regardless of whether the user device is included in a test case. In some embodiments, one or more changes are made by, for example, a system administrator or programmer to the software application to address the issue identified in the software application. After issues with the software application are addressed, the software application may be re-released to user devices included in a test group and the method 400 or the method 800 may be repeated.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms, for example, first and second, top and bottom, and the like may be used solely to distinguish one entity or action from another entity or action without necessarily requiring or implying any actual such relationship or order between such entities or actions. The terms “comprises,” “comprising,” “has,” “having,” “includes,” “including,” “contains,” “containing” or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by “comprises . . . a,” “has . . . a,” “includes . . . a,” or “contains . . . a” does not, without more constraints, preclude the existence of additional identical elements in the process, method, article, or apparatus that comprises, has, includes, contains the element. The terms “a” and “an” are defined as one or more unless explicitly stated otherwise herein. The terms “substantially,” “essentially,” “approximately,” “about” or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term “coupled” as used herein is defined as connected, although not necessarily directly and not necessarily mechanically. A device or structure that is “configured” in a certain way is configured in at least that way, but may also be configured in ways that are not listed.

Various features, advantages, and embodiments are set forth in the following claims.

What is claimed is:

1. A system for automatically identifying an issue with a new version of a software application, the system comprising:

an electronic processor, the electronic processor configured to:

implement at least one machine learning system including a recurrent neural network formed of a plurality of sequentially coupled long short term memory units;

construct a first probabilistic graphical model of possible user actions with a first software application, the first probabilistic graphical model including clusters of sequences of possible user actions with the first software application;

construct a second probabilistic graphical model of possible user actions with a second software application, the second probabilistic graphical model including clusters of sequences of possible user actions with the second software application, wherein the second software application is a new version of the first software application;

using the recurrent neural network of the at least one machine learning system, determine, for a given testcase and based on the clusters of sequences of possible user actions in the first and second probabilistic models, a first next user action following a first partial sequence of user actions in the first software application and a second next user action following a second partial sequence of user actions in the second software application;

determine whether a difference between the first and second next user actions satisfies a threshold; and based on determining the difference satisfies the threshold, indicate an issue with the second software application; and based on indication of an issue with the second software application, make the second software application inaccessible to one or more user devices.

2. The system according to claim 1, wherein the electronic processor is configured to construct the first probabilistic graphical model based on recorded user actions for the first software application and an indication of an order in which the recorded user actions occurred.

3. The system according to claim 2, wherein the first probabilistic graphical model includes a plurality of nodes, each node of the plurality of nodes representing a respective graphical user interface element displayed when a user interacts with the first software application and wherein each node of the plurality of nodes is connected to one or more nodes included in the first probabilistic graphical model based on the order that the recorded user actions occurred.

4. The system according to claim 1, wherein the at least one machine learning system is trained using sequences of user actions included in the first probabilistic graphical model.

5. The system according to claim 1, wherein the electronic processor is configured to determine a test case including one or more computer executable instructions that, when executed, cause the electronic processor to simulate interaction by a human user with the first software application.

6. The system according to claim 1, wherein the electronic processor is configured to identify noise by:

determining a confidence interval and a mean of a cluster and for one or more sequences of user actions included in the cluster;

determining whether a distance of a sequence of user actions among the one or more sequences of user actions from the mean of the cluster is within the confidence interval; and when the distance of the sequence of user actions from the mean of the cluster is not within the confidence interval, identifying the sequence of user actions as noise.

7. The system according to claim 1, wherein the electronic processor is configured to determine a test case from one or more of the clusters using the at least one machine learning system.

8. A method for automatically identifying an issue with a new version of a software application, the method comprising:

implementing, with an electronic processor, at least one machine learning system including a recurrent neural network formed of a plurality of sequentially coupled long short term memory units; constructing, with the electronic processor, a first probabilistic graphical model of possible user actions with a first software application, the first probabilistic graphical model including clusters of sequences of possible user actions with the first software application;

constructing, with the electronic processor, a second probabilistic graphical model of possible user actions with a second software application, the second probabilistic graphical model including clusters of sequences of possible user actions with the second software application, wherein the second software application is a new version of the first software application;

using the recurrent neural network of the at least one machine learning system, the electronic processor determining, for a given testcase and based on the clusters of sequences of possible user actions in the first and second probabilistic models, a first next user action following a first partial sequence of user actions in the first software application and a second next user action following a second partial sequence of user actions in the second software application;

determining, with the electronic processor, whether a difference between the first and second next user actions satisfies a threshold;

based on determining the difference satisfies the threshold, the electronic processor indicating an issue with the second software application; and based indication of an issue with the second software application, the electronic processor making the second software application inaccessible to one or more user devices.

9. The method according to claim 8, wherein constructing the first probabilistic graphical model includes the electronic processor constructing the first probabilistic graphical model based on recorded user actions for the first software application and an indication of an order in which the recorded user actions occurred.

10. The method according to claim 9, wherein the first probabilistic graphical model includes a plurality of nodes, each node of the plurality of nodes representing a respective graphical user interface element displayed when a user interacts with the first software application and wherein each node of the plurality of nodes is connected to one or more nodes included in the first probabilistic graphical model based on the order that the recorded user actions occurred.

11. The method according to claim 8, wherein the at least one machine learning system is trained using sequences of user actions included in the first probabilistic graphical model.

12. The method according to claim 8, further comprising:

the electronic processor determining a test case, wherein the test case includes one or more computer executable instructions that, when executed, cause the electronic processor to simulate interaction by a human user with the first software application.

13. The method according to claim 8, the method further comprising identifying noise by:

for one or more sequence of user actions included in a cluster, determining whether a distance of a sequence of user actions among the one or more sequences of user actions from a mean of the cluster is within a confidence interval; and based on the distance of the sequence of user actions from the mean of the cluster not being within the confidence interval, identifying the sequence of user actions as noise.

14. The method according to claim 8, further comprising the electronic processor determining a test case from one or more of the clusters using the at least one machine learning system.

15. A program product for automatically identifying an issue with a new version of a software application, the program product comprising:

a non-transitory, computer-readable storage medium; and program instructions in the storage medium that, when executed, cause an electronic processor to perform:

implementing, with an electronic processor, at least one machine learning system including a recurrent neural network formed of a plurality of sequentially coupled long short term memory units;

constructing, with the electronic processor, a first probabilistic graphical model of possible user actions with a first software application, the first probabilistic graphical model including clusters of sequences of possible user actions with the first software application;

constructing, with the electronic processor, a second probabilistic graphical model of possible user actions with a second software application, the second probabilistic graphical model including clusters of sequences of possible user actions with the second software application, wherein the second software application is a new version of the first software application;

using the recurrent neural network of the at least one machine learning system, the electronic processor determining, for a given testcase and based on the clusters of sequences of possible user actions in the first and second probabilistic models, a first next user action following a first partial sequence of user actions in the first software application and a second next user action following a second partial sequence of user actions in the second software application;

determining, with the electronic processor, whether a difference between the first and second next user actions satisfies a threshold; and based on determining the difference satisfies the threshold, the electronic processor indicating an issue with the second software application; and based on indication of an issue with the second software application, making the second software application inaccessible to one or more user devices.

16. The program product according to claim 15, wherein the program instructions further cause the electronic processor to perform:

determining a test case from one or more of the clusters using the at least one machine learning system.

* * * * *